United States Patent
Li et al.

(10) Patent No.: US 8,291,392 B2
(45) Date of Patent: Oct. 16, 2012

(54) DYNAMIC SPECIALIZATION OF XML PARSING

(75) Inventors: Jianhui Li, Shanghai (CN); Hui Chen, Shanghai (CN); Tianyou Li, Shanghai (CN); Tao Xie, Shanghai (CN); Kevin Jones, N. Yoks (GB)

(73) Assignee: Intel Corporation, Santa Clara, CA (US)

( * ) Notice: Subject to any disclaimer, the term of this patent is extended or adjusted under 35 U.S.C. 154(b) by 1051 days.

(21) Appl. No.: 12/242,473

(22) Filed: Sep. 30, 2008

(65) Prior Publication Data

US 2010/0083216 A1 Apr. 1, 2010

(51) Int. Cl.
*G06F 9/45* (2006.01)
*G06F 17/00* (2006.01)
(52) U.S. Cl. ........................ 717/143; 715/234
(58) Field of Classification Search ................... 717/106, 717/136–143, 114–115; 715/234–239
See application file for complete search history.

(56) References Cited

U.S. PATENT DOCUMENTS

| 6,925,631 | B2* | 8/2005 | Golden ................. 717/115 |
| 7,305,626 | B2* | 12/2007 | Tiku ................. 715/745 |
| 7,640,492 | B2* | 12/2009 | Soderberg et al. ....... 715/234 |
| 7,836,393 | B2* | 11/2010 | Soderberg et al. ....... 715/234 |
| 7,991,799 | B2* | 8/2011 | Heifets et al. ............. 707/803 |
| 8,117,530 | B2* | 2/2012 | Matsa et al. ............... 715/203 |
| 2002/0099734 | A1* | 7/2002 | Yassin et al. ............... 707/513 |
| 2004/0117776 | A1* | 6/2004 | Pazandak ................. 717/143 |
| 2007/0050704 | A1* | 3/2007 | Liu ........................... 715/513 |
| 2007/0050706 | A1* | 3/2007 | Liu et al. .................. 715/513 |
| 2007/0113221 | A1* | 5/2007 | Liu et al. .................. 717/143 |
| 2008/0184103 | A1* | 7/2008 | Liu et al. .................. 715/234 |
| 2008/0201697 | A1* | 8/2008 | Matsa et al. ............... 717/143 |
| 2010/0070524 | A1* | 3/2010 | Bae et al. .................. 707/769 |
| 2010/0180195 | A1* | 7/2010 | Behrens et al. ........... 715/234 |

* cited by examiner

*Primary Examiner* — Christopher B Shin
(74) *Attorney, Agent, or Firm* — Schwabe, Williamson & Wyatt, P.C.

(57) ABSTRACT

Methods and apparatuses for creating a dynamic profile for a plurality of structurally similar extensible markup language (XML) documents based at least in part on a document structure or data pattern of the XML documents. A specialized XML parser is generated based at least in part on the dynamic profile and then is specialized in parsing XML documents that substantially match the dynamic profile.

17 Claims, 4 Drawing Sheets

DYNAMIC SPECIALIZATION OF XML PARSING

TECHNICAL FIELD

This disclosure relates generally to the field of data processing, more specifically, to the parsing of Extensible Markup Language (XML) documents.

BACKGROUND

Extensible Markup Language (XML) has become the standard for information storage and exchange over the Internet. XML, a mark-up language that is a subset of the Standard Generalized Markup Language (SGML), is used for describing data and is thus a complementary format to HyperText Markup Language (HTML), which is primarily used for displaying data. In XML, a user can define or create tags which are used to define elements. The first element of an XML document is called the root element and all other elements (sub-elements or children) are nested within the root element. According to one method of processing an XML document, a computer program called an XML parser may read the XML document into memory and convert it into an object model such as an XML document object model (DOM) object. The data can be read and manipulated by the XML parser which accesses the DOM. An XML parser may also provide results in other formats, such as for example, an XML event data sequence for SAX (Simple API for XML). Oftentimes, an XML parser will receive a group of XML documents from a similar location, such as for example, from a particular server. Many of these documents to be parsed are modified versions of the same XML document and thus will have similar document structures and/or data patterns.

BRIEF DESCRIPTION OF THE DRAWINGS

Embodiments of the present invention will be described by way of exemplary embodiments, but not limitations, illustrated in the accompanying drawings in which like references denote similar elements, and in which.

DETAILED DESCRIPTION OF ILLUSTRATIVE EMBODIMENTS

Illustrative embodiments of the present invention include, but are not limited to, methods and apparatuses for dynamic specialization of XML parsing.

Various aspects of the illustrative embodiments will be described using terms commonly employed by those skilled in the art to convey the substance of their work to others skilled in the art. However, it will be apparent to those skilled in the art that alternate embodiments may be practiced with only some of the described aspects. For purposes of explanation, specific numbers, materials, and configurations are set forth in order to provide a thorough understanding of the illustrative embodiments. However, it will be apparent to one skilled in the art that alternate embodiments may be practiced without the specific details. In other instances, well-known features are omitted or simplified in order not to obscure the illustrative embodiments.

Further, various operations will be described as multiple discrete operations, in turn, in a manner that is most helpful in understanding the illustrative embodiments; however, the order of description should not be construed as to imply that these operations are necessarily order dependent. In particular, these operations need not be performed in the order of presentation. The phrase "in one embodiment" is used repeatedly. The phrase generally does not refer to the same embodiment; however, it may. The terms "comprising," "having," and "including" are synonymous, unless the context dictates otherwise.

Figure 1:
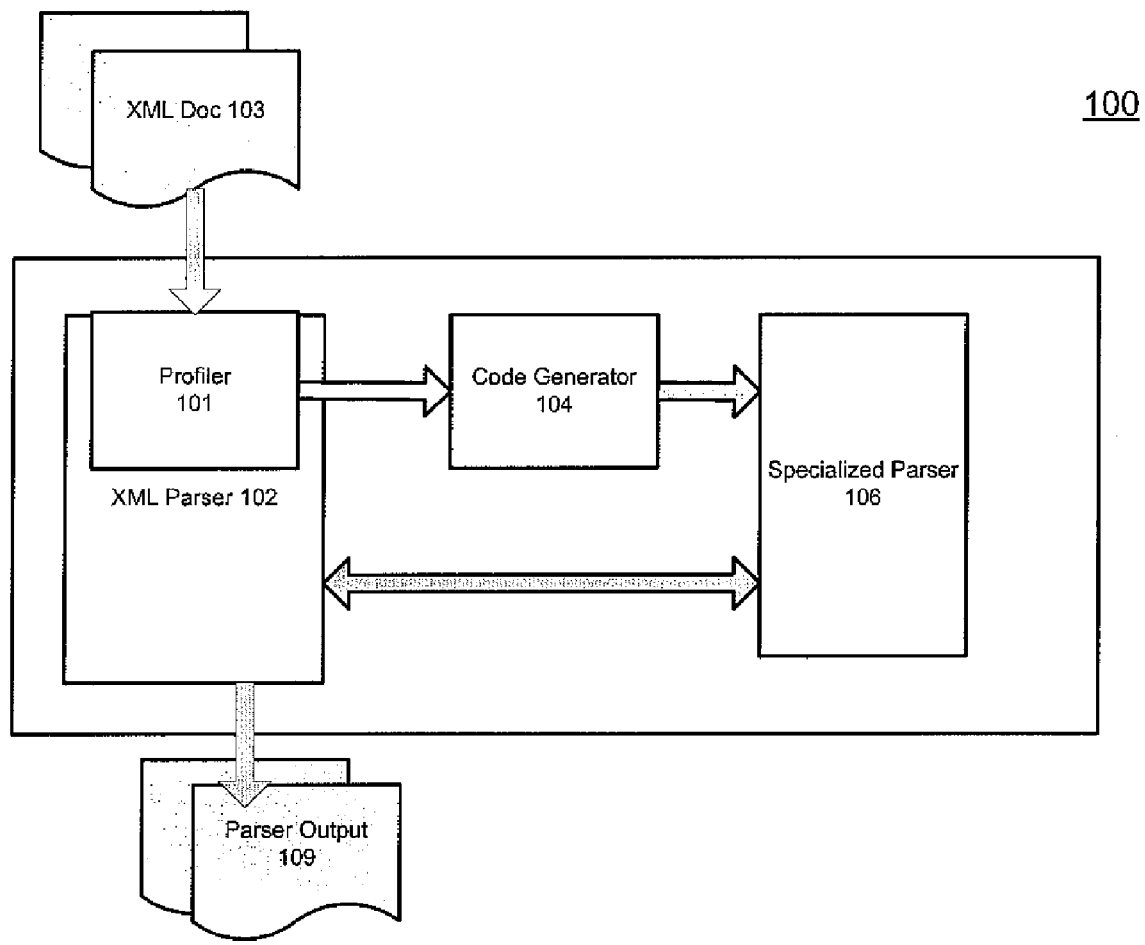
FIG. 1 is a block diagram illustrating an apparatus, in accordance with an embodiment of the present invention.

FIG. 1 is a block diagram illustrating an apparatus 100, in accordance with an embodiment of the invention. As shown, apparatus 100 may be a computing device that includes an XML parser 102, code generator 104, and a specialized XML parser 106. In the embodiment, XML parser 102 may be a general purpose XML parser configured to parse XML documents and generate parser output 109. The parser output 109 may be, but is not limited to, DOM or XML data sequence for SAX (Simple API for XML). Unlike a typical general XML parser, however, XML parser 102 in accordance with teachings of the present disclosure, also includes a profiler 101 configured to generate a dynamic profile (not shown) for a plurality of structurally similar XML documents 103 based at least in part on the similarity of document structure and/or data pattern of the XML documents. The similar XML documents may be, for example, XML documents associated with a particular application or from a particular server. Accordingly, the similar XML documents may be considered as a subset of all possible XML documents. In various embodiments, profiler 101 is also configured to determine whether a subsequent XML document 103 is similar to previously profiled XML documents 103.

As illustrated, a code generator 104 may be operatively coupled to XML parser 102, and configured to generate specialized XML parser 106 based at least in part on the dynamic profile created by profiler 101. Thus, specialized XML parser 106 is specialized in parsing all or portions of subsequent XML documents that substantially match the dynamic profile of the profiled XML documents. In embodiments where the specialized parser merely parses a portion of the subsequent similar documents, the remaining parsing may be completed by the general XML parser 102. So, if a subsequent XML document does not substantially match the dynamic profile, the profiler 101 may fall back and invoke general parser 102 to do actual parsing of the subsequent non-similar XML document. In various embodiments, if the profiler 101 falls back too frequently to the general parser 102, this may indicate a change of document structure and data pattern among XML documents to be parsed and thus may trigger a repeat of the profiling, re-generation and/or modification of specialized XML parser 106.

In various embodiments, XML parser 102, code generator 104 and specialized parser 106 may be operated by the same or different processors (not shown) having associated or unassociated memory (not shown). In various embodiments, XML parser 102, code generator 104 and specialized parser 106 may be operated in the same or a different execution environment, such as, for example, different virtual machines (not shown) of the same or different computing devices. In various embodiments, specialized parser 106 may be operated on top of an XML parsing virtual machine (not shown).

Figure 2:
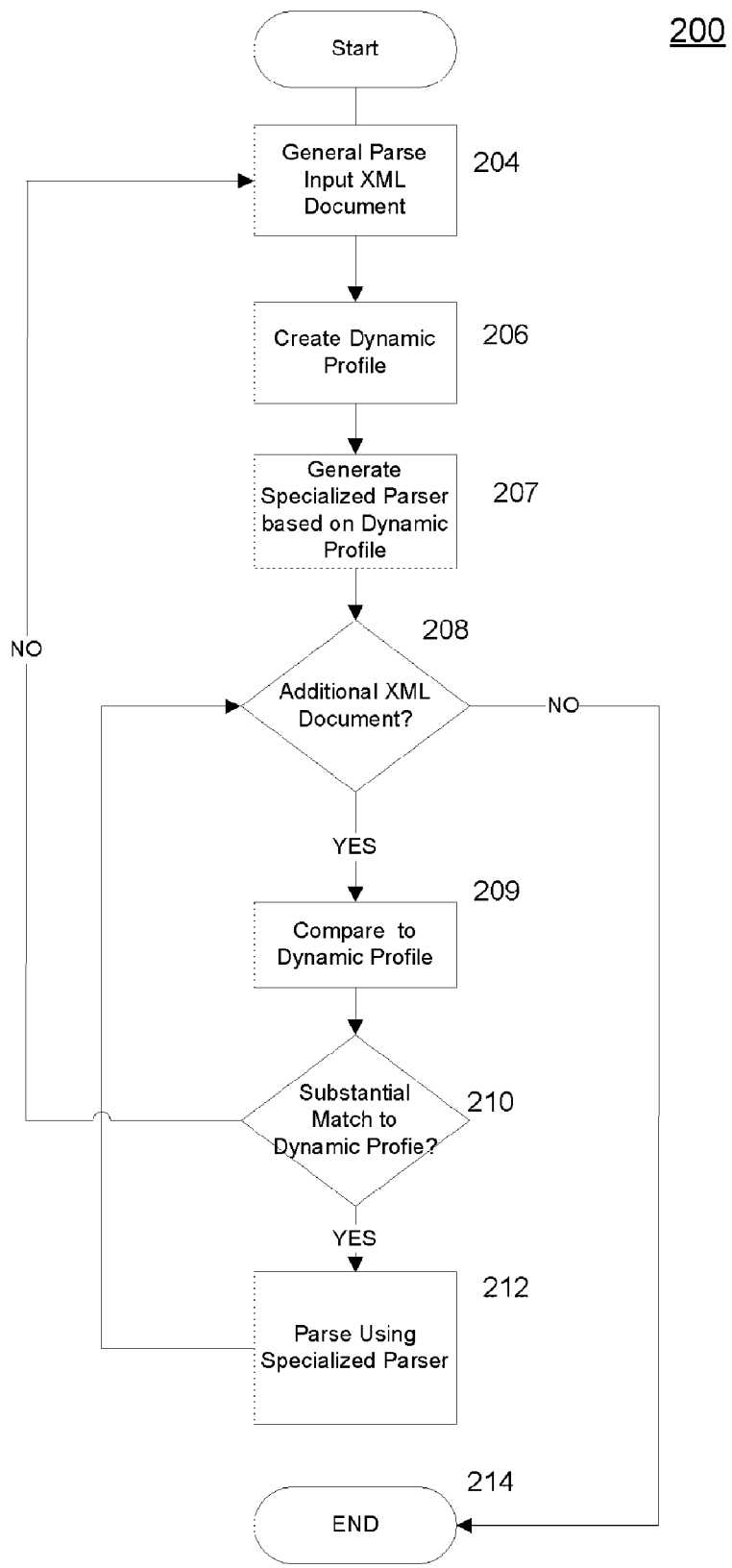
FIG. 2 illustrates a flow diagram, in accordance with an embodiment of the present invention.

To further illustrate, FIG. 2 is a simplified example sequence of operations for dynamically generating a specialized XML parser 106 and parsing one or more XML documents using the specialized XML parser 106. In various embodiments, the method represented by portions of flow diagram 200 may be implemented by software, software modules and/or other programming instructions stored in one or more machine-readable storage media. Beginning at a block 204, for the embodiment, an XML parser, such as XML parser 102 from FIG. 1, may generally parse an input XML document. As the XML parser 102 generally parses the input XML document, its profiler may collect document structure and data pattern information about the input XML document. In the context of this specification, "general or generally parsing" denotes parsing of an input XML document using a code or program that is not tailored nor "specialized" to a document structure and/or data pattern of the particular input XML document. The "general parser" is thus in contrast to specialized XML parser 106 which is generated by code generator 104 based upon a dynamic profile created for a collection of similar XML documents (discussed below).

Returning to flow diagram 200, at a next block 206, using the collected document structure and data pattern information, the XML parser 102 may create the dynamic profile. As will be discussed in connection with FIG. 3 below, in an embodiment, the dynamic profile may include a unique structure that allows for comparison of document structure and data pattern of input XML documents to the dynamic profile. For example, in one embodiment, the dynamic profile may include a dynamic profile structure including a hierarchical structure such as a tree structure having multiple nodes representing a common document structure and data pattern among XML documents that are to be processed.

Once the XML parser 102 has created the dynamic profile at block 206, the process may move to block 207, where code generator 104 can then generate specialized XML parser 106 based at least in part on the dynamic profile. Thus, in the embodiment, the specialized XML parser 106 is specialized in parsing XML documents that substantially match the dynamic profile (enabling or allowing more efficient parsing of XML documents). From block 207, the process moves to block 208, where method may then check for additional input XML documents. If there are none, the process can end at a block 214. If an additional input XML document is received or waiting to be parsed or processed, however, the process flows from block 208 to block 209, where the XML parser 102 can compare the additional input XML document to the dynamic profile. If the additional input XML document substantially matches the dynamic profile such that efficiencies may be gained by using the specialized XML parser 106, the answer at next decision block 210 is YES and the specialized XML parser 106 may parse the additional input XML document at block 212. What constitutes substantial matching may be application dependent, depending on the precision desired. Similarity may be determined, for example, based on the number of identical nodes or branches in the structure of the document or other attributes. In one embodiment, the specialized XML parser 106 can process the XML document by invoking functions using pre-computed event data and does not have to perform typical parsing which can be computationally intensive and time consuming.

Alternately, if the additional input XML document at block 208, does not substantially match the dynamic profile, then the answer at block 210 is NO and the process flows upwards to block 204 where, rather than parsing the additional input XML document via specialized XML parser 106, the XML parser 102 will general parse the additional input XML document. In various embodiments, based on the number of times the general XML parser has fallen back after the last generation of the specialized parser, the general XML parser 102 may create a new dynamic profile or modify the existing dynamic profile based upon the document structure and/or data pattern of the additional input XML document. In the embodiment, at next block 207, code generator 104 may then generate a new specialized XML parser or modify the specialized XML parser 106 based on the new dynamic profile or modified dynamic profile. Thus, the specialized XML parser 106 may be able to process and/or parse future input XML documents matching a similar document structure and/or data pattern of this particular additional input XML document.

Next, at block 208, the XML parser 102 again checks for an additional input XML document. If there is no additional input XML document, the answer is NO and the process may end at a block 214. If the answer is YES, the process may loop through blocks 208-212, comparing the additional input XML document and then parsing the additional input XML document with the specialized XML parser 106 when there is a substantial match of an additional input XML document to the dynamic profile. As described above, the process may also branch off to block 204 from block 210 when an additional input XML document does not substantially match the dynamic profile. When there are no more additional XML documents to be parsed, the process ends at a block 214. Note that in one embodiment, a substantial matching of the dynamic profile may include a substantial matching of a portion of an XML document to the dynamic profile.

Figure 3:
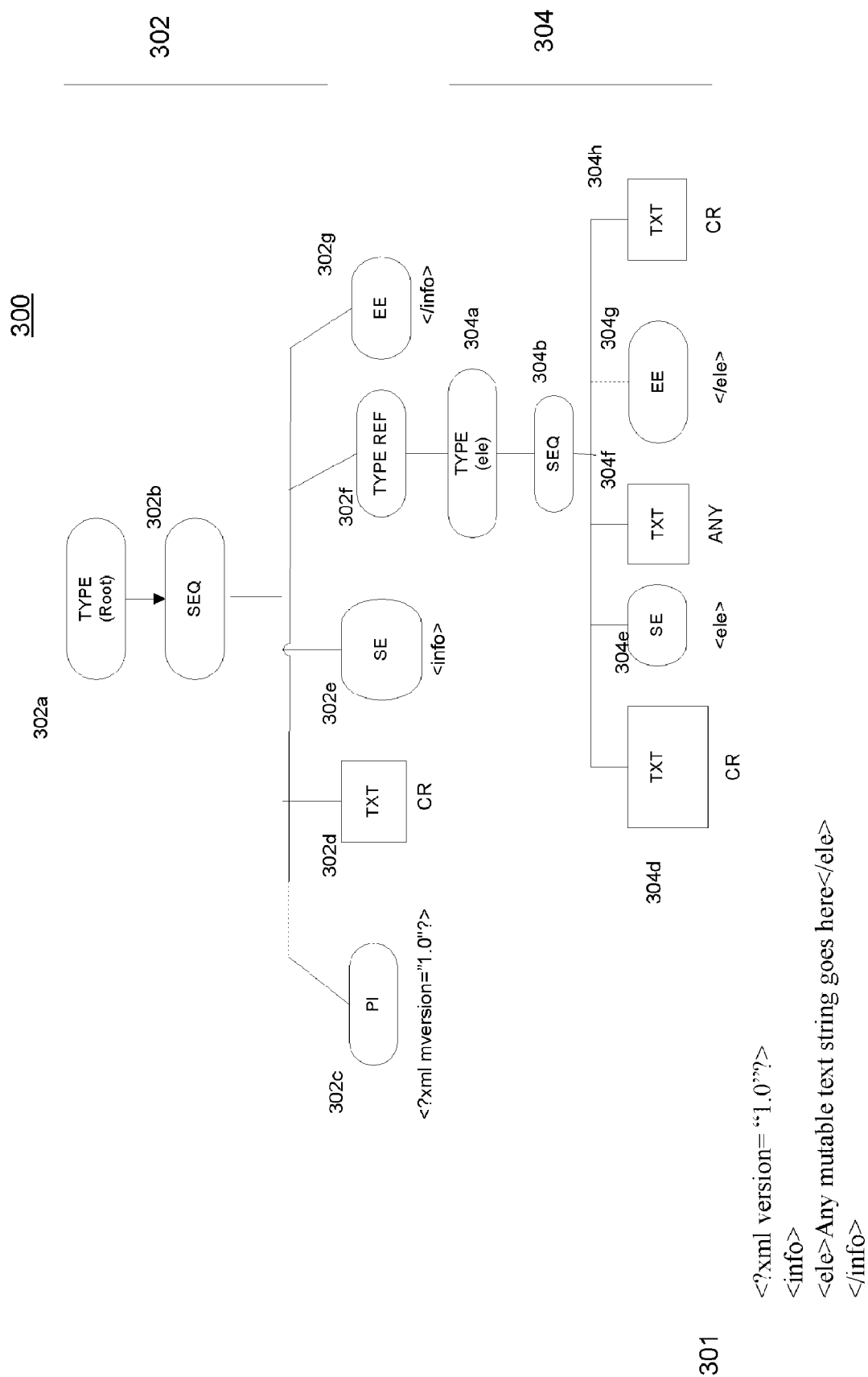
FIG. 3 illustrates a dynamic profile structure, in accordance with various embodiments of the present invention.

FIG. 3 illustrates a simplified example of a dynamic profile structure or dynamic profile 300 in accordance with an embodiment of the invention. As mentioned earlier, XML "elements" include content nested between a start tag and an end tag. An element located within the start and end tags of another element may be considered a "child" of the "parent" element of which it is contained. In the example of FIG. 3, dynamic profile 300 describes the document structure and data pattern for the short example XML document 301 in the left hand corner of FIG. 3.

In the embodiment shown, creating dynamic profile 300 includes creating a structure including a plurality of trees such as a primary tree 302 and a sub-tree 304 including respective multiple nodes 302(b)-302(g) and 304(a)-304(h) organized to represent a document structure and a data pattern of the example XML document 301. Note that in the embodiment shown, there may be two types of nodes in dynamic profile 300, a compound node and a leaf node, where a compound node may have a child node while a leaf node may not have any child nodes. Thus, the TYPE and Sequence ("SEQ") nodes in FIG. 3 may be compound nodes while the Start Element ("SE"), End Element ("EE"), Text ("TXT"), Processing Instruction ("PI") are examples of leaf nodes. For example, a first node of primary tree 302, TYPE node 302a is a compound node which also corresponds to, or is defined as, a "root" node in the XML document because it contains all other elements in the example XML document 301. Note that the types of nodes in this example are for illustrative purposes and that in various embodiments there may be other suitable node types. For example, other types of nodes may include a choice node where at least one of its child nodes must be shown in an XML document or a loop node might describe a child node to be repeated multiple times (not shown).

Furthermore, in the embodiment shown, TYPE node 302a is a parent to sequence SEQ node 302b which may include a plurality of child nodes, arranged in an order or sequence that they appear in the example XML document 301, thus representing an XML document structure. Thus, in the example of FIG. 3, these nodes are, in order, PI node 302c, TXT node 302d, SE node 302e, TYPE REF node 302f, and EE node 302g. Starting at the beginning of the example XML document 301, the reasons for ordering of nodes 302(c)-302(g) are apparent. PI node 302(c) corresponds to a first line of the example XML document 301, "<?xml version="1.0"?>," which is a processing instruction or declaration defining the XML version to be used (1.0). The next TXT node 302d corresponds to Carriage Return ("CR") because the next element occurs on the following line. Following TXT node 302d is SE 302e corresponding to the SE tag, "<info>." Thus, it follows that, for the embodiment, an additional input XML document that matches the dynamic profile 300 would have child nodes corresponding to similar values in a same sequence as the child nodes of SEQ node 302b.

Similar to primary tree 302, sub-tree 304 includes a TYPE node 304a and a SEQ node 304b, under which its descendent or child nodes include TXT node 304d, SE node 304e, TXT node 304f, EE node 304g, and TXT node 304h, and is again ordered in the sequence they occur in the example XML document 301. Further, in the example, SE node 304e corresponds to start tag, <ele>, TXT node 304d associated with mutable text, which can be any mutable text, in this case "Any text string goes here," and EE node 304g is associated with the end tag </ele>. Note that for the embodiment, each leaf node, with the exception of the TYPE REF node 302f which indicates a sub-element of the primary tree 302, and the TXT node ANY 304f which is associated with mutable text, may be associated with a data pattern of the XML document. In the embodiment, the pattern information may describe predicted byte-level string patterns of an event or attributes and namespace information for an element, such as for example, a Start Element (SE) event. In an embodiment, the pattern is a constant pattern if it contains a constant string.

Figure 4:
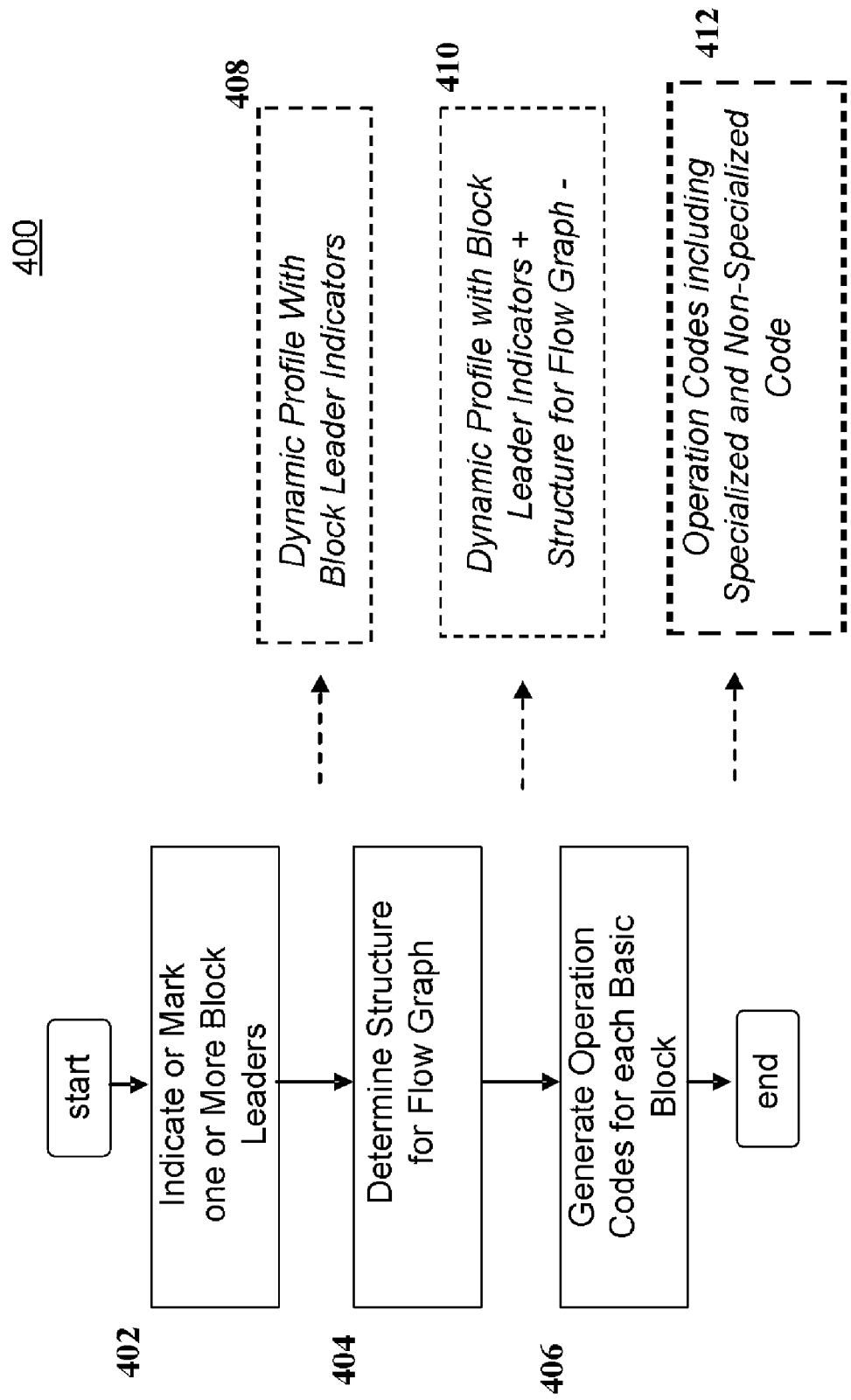
FIG. 4 illustrates another flow diagram, in accordance with an embodiment of the present invention.

FIG. 4 is a simplified flow chart 400 describing generation of the specialized XML parser 106 according to an embodiment of the invention. As described previously, code generator 104 generates specialized XML parser 106 based upon a dynamic profile, such as for example, dynamic profile 300. In the embodiment shown, phases of code generation 402, 404, 406 are shown on a left side of the figure and intermediate outcomes 408, 410 and 412 are shown on the right side. The phases of code generation include indicating or marking one or more block leaders 402, determining a structure for a control flow graph or flow graph 404, and generating operation codes 406. Intermediate outcomes include a dynamic profile with block leader indicators 408, dynamic profile with block leader indicators and structure for flow graph 410 and operation codes including specialized and non-specialized codes 412.

In the embodiment, marking one or more block leaders includes evaluating a node of a dynamic profile such as dynamic profile 300 and then marking the node and/or one of its child nodes as a block leader for a future basic block of code in the specialized XML parser 106. Thus, for example, TYPE node 302a or 304a from FIG. 3 along with a corresponding child node 302b and 304b may be marked as a block leader. Examples of other nodes marked as a block leader may include a CHOICE node, a LOOP node (not shown), or other suitable nodes which indicate a transition or logical grouping for parsing. Thus, an outcome of indicating the block leaders at 402 includes a dynamic profile with block leader indicators at 408.

Returning to the left side of FIG. 4, a flow graph structure for the specialized XML parser 106 may be determined at phase 404. In the embodiment shown, the flow graph structure may be determined by first forming a data sequence including substantially all of the nodes of dynamic profile 300 and using the marked block leaders as one or more delimiters of the data sequence to divide the data sequence into multiple sub-sequences. The nodes of each sub-sequence may then be placed into a basic block representing a future basic block of code of the flow graph. These basic blocks may then be ordered and/or connected to determine the flow graph structure at 410. Finally, in phase 406, operation codes may be generated. These operation codes may include instructions for parsing that are generated for each basic block based on types of nodes in the basic blocks. For example, the operation codes generated may include instructions for matching a data stream with a specific pattern using a string comparison and/or for reading an event using special functions according to the data structure and/or patterns in the dynamic profile 300. The operation codes may also include non-specialized codes for reading events in a manner that a general parser would read events.

Although specific embodiments have been illustrated and described herein, it will be appreciated by those of ordinary skill in the art that a wide variety of alternate and/or equivalent implementations may be substituted for the specific embodiments shown and described, without departing from the scope of the embodiments of the present invention. This application is intended to cover any adaptations or variations of the embodiments discussed herein. Therefore, it is manifestly intended that the embodiments of the present invention be limited only by the claims and the equivalents thereof.

What is claimed is:

1. A method, comprising:
   creating by a computing device, a dynamic profile for a plurality of structurally similar extensible markup language (XML) documents based at least in part on a document structure or data pattern of the XML documents; and
   generating by a computing device, a specialized XML parser based at least in part on the dynamic profile, wherein the specialized XML parser is operable by a computing device and specialized in parsing XML documents that substantially match the dynamic profile, the XML documents that substantially match the dynamic profile being a subset of all possible XML documents.

2. The method of claim 1 further comprising parsing by the specialized XML parser an XML document that substantially matches the dynamic profile.

3. The method of claim 2 further comprising falling back to a general XML parser to parse an XML document that does not substantially match the dynamic profile.

4. The method of claim 1 further comprising running the specialized XML parser on top of an XML parsing virtual machine.

5. The method of claim 1 wherein the creating the dynamic profile for the plurality of structurally similar XML documents includes creating a dynamic profile structure including a hierarchical structure including multiple nodes associated with the document structure and data pattern of the XML documents.

6. The method of claim 5 wherein the creating the dynamic profile structure includes creating a type node and descendent nodes of the type node to represent byte-level string patterns.

7. The method of claim 1 wherein generating the specialized XML parser comprises evaluating a plurality of nodes in the dynamic profile to indicate a block leader of a future basic block of code, ordering and connecting the basic blocks, and generating specialized code for each basic block.

8. An apparatus comprising:
   a general purpose extensible markup language (XML) parser configured to parse XML documents, including a profiler configured to generate a dynamic profile for a plurality of structurally similar extensible markup language (XML) documents based at least in part on document structure of the XML documents; and a code generator operatively coupled to the general purpose XML parser, and configured to generate a specialized XML parser based at least in part on the dynamic profile, wherein the specialized XML parser is specialized in parsing XML documents that substantially match the dynamic profile, the XML documents that substantially match the dynamic profile being a subset of all possible XML documents.

9. The apparatus of claim 8 wherein the profiler is configured to generate a dynamic profile including a plurality of trees and sub-trees having multiple nodes representing an ordering and sequence of elements in the structurally similar XML documents.

10. The apparatus of claim 8 wherein the apparatus further comprises a XML parsing virtual machine to host operation of the specialized XML parser.

11. The apparatus of claim 8 wherein the code generator is configured to generate the specialized XML parser by evaluating a plurality of nodes in the dynamic profile to indicate a block leader of a future basic block of code, ordering and connecting the basic blocks, and generating specialized code for each basic block.

12. The apparatus of claim 11 wherein the code generator is further configured to generate non-specialized code to parse an XML document that does not match the dynamic profile.

13. An article of manufacture comprising:

a storage medium; and a plurality of programming instructions stored in the stored medium, configured to program a computing device with at least one of:

a general purpose extensible markup language (XML) parser configured to parse XML documents, including a profiler configured to generate a dynamic profile for a plurality of structurally similar extensible markup language (XML) documents based at least in part on a data pattern of the XML documents; or a code generator configured to generate a specialized XML parser based at least in part on a dynamic profile created by the general purpose (XML) parser for a plurality of structurally similar extensible markup language (XML) documents, wherein the specialized XML parser is specialized in parsing XML documents that substantially match the dynamic profile, the XML documents that substantially match the dynamic profile being a subset of all possible XML documents.

14. The article of manufacture of claim 13 wherein the plurality of programming instructions includes instructions to generate the dynamic profile based on predicted byte-level string patterns, the predicted byte-level string patterns represented by leaf nodes in the dynamic profile.

15. The article of manufacture of claim 13 wherein the plurality of programming instructions further include instructions to parse an XML document by the specialized XML parser if the XML document substantially matches the dynamic profile and to parse the XML document by the general purpose XML parser if the XML document does not substantially match the dynamic profile.

16. The article of manufacture of claim 13 wherein the specialized XML parser to parse an XML document by processing the XML document by invoking functions using pre-computed event data.

17. The article of manufacture of claim 13 wherein the code generator is configured to generate the specialized parser by evaluating a plurality of nodes in the dynamic profile to indicate a block leader of a future basic block of code, ordering and connecting the basic blocks, and generating specialized code for each basic block.

* * * * *